United States Patent [19]

Bukac et al.

[11] 3,843,608

[45] Oct. 22, 1974

[54] PREPARING POLYAMIDES BY ANIONIC POLYMERIZATION OF LACTAMS

[75] Inventors: Zbynek Bukac; Jan Sebenda, both of Prague, Czechoslovakia

[73] Assignee: Ceskoslovenska Akademie ved., Prague, Czechoslovakia

[22] Filed: July 26, 1972

[21] Appl. No.: 275,155

[30] Foreign Application Priority Data
July 27, 1971 Czechoslovakia ............... 5478-71
July 27, 1971 Czechoslovakia ............... 5481-71

[52] U.S. Cl. ............................ 260/78 L, 260/78 P
[51] Int. Cl. ........................................ C08g 20/18
[58] Field of Search ...................... 260/78 L, 78 P

[56] References Cited
UNITED STATES PATENTS
3,216,977   11/1965   Brouns ........................... 260/78 L
3,519,624   7/1970   Huber-Emden et al. ....... 260/78 L X
3,671,500   6/1972   Johnson ........................... 260/78 L

OTHER PUBLICATIONS

Grant, J. Hackh's Chemical Dictionary, Third Edition, McGraw-Hill, N.Y., (1944) pg. 605 QD 5H 31944.

Primary Examiner—Lucille M. Phynes
Attorney, Agent, or Firm—Murray Schaffer

[57] ABSTRACT

A method of preparing polyamides by anionic polymerization of cyclic lactams which comprises polymerizing at least one such lactam in the presence of at least one co-catalyst selected from the group consisting of N-substituted 1,3-oxazines, 1,3-thiazines, trioxopiperidines and thiodioxopiperidines.

9 Claims, No Drawings

PREPARING POLYAMIDES BY ANIONIC POLYMERIZATION OF LACTAMS

The invention relates to a method of preparing polyamides by anionic polymerization and copolymerization of lactams with from 3 to 12 carbon atoms in their rings. The present invention is related to copending U.S. Pat. application Ser. No. 275,156 filed on even date herewith, based upon Czechoslovak Application Nos. PV 5478-71 and PV 5481-71, filed July 27, 1971 to which reference can be made. In the present application there is utilized as co-catalysts, six-membered heterocyclic compounds selected from the group consisting of N-substituted 1,3-oxazines, 1,3-thiazines, trioxopiperidines and thiodioxopiperidines of the general formulae

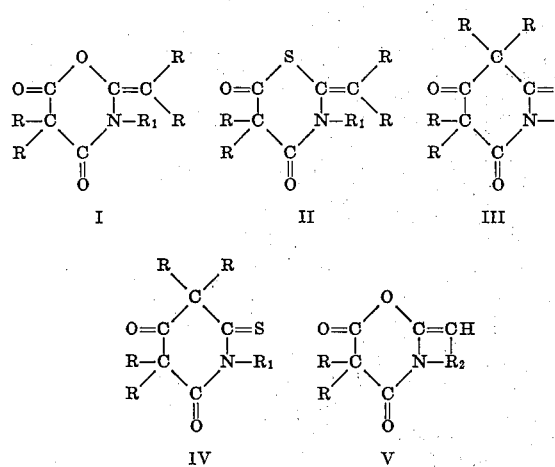

wherein R is an alkyl or alkenyl with from one to 18 carbon atoms, or an aralkyl derived from a lower alkyl, $R_1$ is either R or an aryl, or a dialkylaminoaryl or an alkoxyaryl, the alkyls being lower alkyls, $R_2$ is an alkenyl with from 2 to 10 carbon atoms.

Anionic polymerization of lactams as e.g. epsilon-caprolactam, is catalyzed by strong bases such as alkali metal salts of the lactam. The rate of polymerization is, however, sufficiently high only at comparatively high temperatures of about 250°C, thus above the melting point of the polyamide. The rate of polymerization can be substantially increased by adding co-catalysts with acylating or carbamoylating activity such as diacylamines, 3-ketoacylamides or isocyanates, so that the polymerization can be carried out without melting the polyamide. In this way, large castings may be manufactured by direct polymerization in the mold, bubbles and cavities caused by solidification of the melt being avoided. Said co-catalysts possess, however, also some shortcomings. The co-catalysts containing imide groups are sensitive to bases, undergoing side-reactions by which the co-catalyst is consumed. The polymer-monomer equilibrium may be therefore reached only within a narrow range of reaction conditions. This shortcoming may be partly removed by using more-than-bicomponent catalytic systems, e.g. according to the Czechoslovak Patent Specification No. 138,160, such systems are, however, more complex than bicomponent ones. Activators of the type of amides of 3-oxocarboxylic acids (see U.S. Pat. No. 3,600,360) have longer life, their co-catalytic activity is, however, very high so that the rate of polymerization is considerable e.g. at 150°C, similarly as in the case of isocyanates. Thereby the time for filling the molds is restricted and the maintaining of adiabatic course of polymerization in large castings is difficult, especially with rapidly polymerizing lactams such as caprylolactam or laurolactam. Polyisocyanates, often used for manufacturing tough castings, have a serious disadvantage in their cancerogenity.

The present invention defined above removes said shortcomings. The polymerization with co-catalysts of the invention is slower at comparatively low temperatures (about 150° to 180°C) than with imides, isocyanates or 3-oxamides (see U.S. Pat. No. 3,600,360). Thereby the pot-life, i.e. the time between the initiation of the monomer and filling the mold, is extended and the manufacture of high quality castings is made easier. Another advantage is that polyisocyanates, used hitherto for obtaining high degree of polymerization and toughness, may be replaced by innocuous substances. The process of the invention is, however, not limited to preparing polyamides with very high molecular weight. The degree of polymerization and thus the viscosity of the melt may be controlled in known manner, using carboxamides or sulfonamides. Therefore, the process of the invention is applicable also for other purposes than making large castings, e.g. also for continuous extrusion according to U.S. Pat. No. 3,200,045 corres. Czech. 97,332. As the co-catalysts of the invention possess a considerable life in the polymerizing system, they may be used also for the two-step polymerization where the polymerizate is shaped at lower conversion and the polymerization is then finished in the shaped article (see e.g. Czechoslovak Patent Specification No. 113,971 corresponding to the U.S. Pat. Application No. 365,507).

Co-catalysts of this invention are suitable for most methods of manufacturing polyamides by anionic polymerization of lactams. This versatility is important in industrial practice.

The co-catalysts defined above may be easily prepared e.g. by reacting dichlorides of malonic acid with amides and thioamids (see the U.S. Pat. No. 3,373,159 and the paper of Martin, James C. et al: J. Org. Chem. 31, 2966 /1966/, or also Ziegler E. et al: Monatsh. Chem. 95, 1318 /1964/, and ibidem, 96, 1347 /1965/, or also by reacting acylisocyanates with ketenes (U.S. Pat. No. 3,394,132). Other co-catalysts mentioned below have been prepared analogically.

The method of the invention is illustrated by following non-limitative Examples. All parts and percentages are meant by weight if not stated otherwise.

EXAMPLE 1

0.319 mol percent of dihydro-2-isopropylidene-3,5,5-trimethyl-4H-1,3-oxazine-4,6 (5H)-dione were dissolved at 90°C in molten caprolactam containing 0.314 mol percent of its sodium salt. The solution was kept at 152°C under inert gas. It solidified within 17 minutes. The polymerizate contained 95.5 percent of polycapronamide, average degree of polymerization about 900.

When using 0.262 mol percent of the same co-catalyst and 0.353 mol percent of the sodium salt of caprolactam and increasing the temperature to 175°C, the melt solidified within about 4 minutes and contained after 30 minutes 96.5 percent of polycaprolactam, intrinsic viscosity in cresol $[\eta] = 5.07$.

EXAMPLE 2

Polymerization mixture, prepared by gradual dissolving 0.321 mol percent of sodium hydride and 0.317 mol percent of dihydro-2-isopropylidene-3-ethyl-5,5-dimethyl-4H-1,3-oxazine-4,6 /5H/-dione in caprolactam was heated 5 minutes to 210°C and then after-polymerized at 175°C for 25 minutes. The polymerizate contained 95.4 percent of polyamide with average degree of polymerization 850. When using acetylcaprolactam as co-catalyst, the conversion attained, at the same conditions, only 89–90 percent.

EXAMPLE 3

Polymerization of caprolactam was carried out with 0.305 mol percent of sodium salt of caprolactam and 0.9 mol percent of the co-catalyst of the Example 1. The polymerization temperature was 210°C, time 30 minutes. The yield of the polyamide amounted to 91 percent, intrinsic viscosity to 2.14, corresponding to an average degree of polymerization 282.

EXAMPLE 4

The polymerization of caprolactam was carried out like in Example 1, at 175°C, except that 0.5 mol percent of N-ethyl-benzamide was added as modifier of molecular weight. At the conversion of 96 percent the average degree of polymerization was only 400, in comparison with 900 reached without modifier.

EXAMPLE 5

The polymerization batch contained 80 percent of caprolactam and 20 percent of gamma-methyl caprolactam, 0.3 mol percent of sodium salt of caprolactam and 0.3 mol percent of dihydro-2-isopropylidene-3-octadecyl-5,5-dimethyl-4H-1,3-oxazine-4,6-/5H/-dione. It was heated for 60 minutes to 175°C. The polymerizate thus obtained contained equilibrium amounts of copolyamide and monomers. Similar results were obtained if gamma-methyl caprolactam was replaced by caprylolactam or laurolactam.

EXAMPLE 6 – 12

Polymerizates with equilibrium or almost equilibrium amounts of the polyamide were prepared by polymerizing caprolactam at 155°C and 175°C for 60 minutes in presence of 0.3 mol percent of sodium salt of caprolactam and 0.3 mol percent of a co-catalyst of the general formula

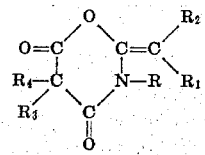

wherein the substituents had the meaning stated in the following Table:

| Example | R | $R_1$ | $R_2$ | $R_3$ | $R_4$ | [η] |
|---|---|---|---|---|---|---|
| 6 | $C_6H_5$ | $CH_3$ | $CH_3$ | $CH_3$ | $CH_3$ | 6.25 |
| 7 | $CH_3$ | $CH_3$ | $C_2H_5$ | $CH_3$ | $CH_3$ | 5.93 |
| 8 | $C_6H_{11}$ | $CH_3$ | $CH_3$ | $CH_3$ | $CH_3$ | 6.31 |
| 9 | $C_2H_5$ | $CH_3$ | $CH_3$ | $C_6H_5CH_2$ | $C_6H_5CH_2$ | 6.20 |
| 10 | p—$CH_3O.C_6H_4$ | $CH_3$ | $CH_3$ | $C_2H_5$ | $C_{18}H_{37}$ | 6.38 |
| 11 | $(CH_3)_2N.C_6H_4$ | $CH_3$ | $CH_3$ | $CH_3$ | $CH_3$ | 5.67 |
| 12 | $C_{18}H_{37}$ | $CH_3$ | $C_3H_7$ | $CH_3$ | $CH_3$ | 6.01 |

EXAMPLE 13

0.3 mol percent of sodium salt of caprolactam was dissolved at 100°C in molten caprolactam, whereafter 0.2 mol percent of 1-ethyl-3,3,5,5-tetramethyl-2,4,6-piperidinetrione was added and the solution kept at 175°C for 30 minutes. The melt solidified after about 5 minutes. After 30 minutes the polymerizate contained 97 percent of very light-colored polymer having intrinsic viscosity 5.77 (in cresol), which corresponds to an average degree of polymerization 1,068. If the same experiment was repeated with the same amount of N,N'-di-(2,2,4-trimethyl-3oxovaleroyl)-hexamethylendiamine, which is a known co-catalyst of the 3-oxoamide type, the average degree of polymerization attained but 731.

EXAMPLE 14

A caprolactam batch, containing 0.3 mol percent of sodium hydride and 0.3 mol percent of dihydro-2-isopropylidene-3-phenyl-5,5-dimethyl-1,3-thiazine-4,6-dione, was polymerized at 175°C according to Example 1. The yield of the polyamide amounted to 95.6 percent. Similar results were obtained if the above co-catalyst was replaced by the same amount of dihydro-2-isopropylidene-3-ethyl-5,5-dibenzyl-1,3-thiazine-4,6-dione or dihydro-2-isopropylidene-3,5,5-triethyl-1,3-thiazine-4,6-dione.

EXAMPLE 15

1 mol percent of sodium hydride and 1 mol percent of dihydro-2-isopropylidene-3-ethyl-5,5-dimethyl-1,3-oxazine-4,6-dione were dissolved at 80°C in 8.5 g of pyrrolidone. At 30°C about 25 percent of polypyrrolidone was formed during 24 hours, whereas without the co-catalyst the polymerization practically did not take place.

EXAMPLE 16

0.3 mol percent of sodium hydride and 0.3 mol percent of the co-catalyst according to the Example 15 were dissolved in molten laurolactam. After 120 minutes at 160°C the polymerizate contained almost the equilibrium amount of the polyamide. Similar result was obtained with caprylolactam.

EXAMPLE 17

0.3 mol percent of the adduct of pyrrolidone with α,α-dimethyl malonyl chloride (prepared according to J. Org. Chem. 31, 2996, 1966) was added to molten caprolactam, containing 0.5 mol percent of its sodium salt. After one hour at 170°C a yield of 96 percent of polycapronamide was attained.

EXAMPLE 18

0.3 mol percent of the co-catalyst mentioned in Example 1 was dissolved in a 5 percent solution of 3,4-trimethylene-2-azetidinone in anhydrous dimethylsulfoxide. 0.3 mol percent of butyl lithium in heptane solution was added and the solution kept at 30°C for 30 minutes. The polyamide was precipitated with ether in a yield of almost 100 percent.

EXAMPLE 19

The experiment described in Example 13 was repeated, using 0.324 mol percent of the sodium salt and 0.332 mol percent of the same co-catalyst. The batch was heated 5 minutes to 210°C and 25 minutes to 175°C. Then the polymerizate contained 95.6 percent of an almost white polyamide, degree of polymerization 872.

EXAMPLE 20

Polymerization mixture containing 0.29 mol percent of sodium and 0.304 mol percent of the co-catalyst mentioned in Example 13 was polymerized at 152°C. Within 16 to 17 minutes the solution solidified and after 60 minutes at the same temperature contained 97.5 percent of a highly white polycapronamide having the intrinsic viscosity 6.03.

EXAMPLE 21

A solution containing 0.305 mol percent sodium and 0.9 mol percent of the co-catalyst as in Example 13 in caprolactam was kept at 210°C for 30 minutes. Thereafter the polymerizate contained 91 percent of polycapronamide, intrinsic viscosity 2.14.

EXAMPLE 22

Analogical results as in Examples 13, 19, 20 and 21 were obtained if the co-catalyst was replaced by the same amount of 1-phenyl- or 1-(p-methoxy)- or also 1-(p-tolyl)-3,3,5,5-tetramethyl piperidinetrione.

EXAMPLE 23

A mixture of 15 percent of gamma-methyl caprolactam and 75 percent of caprolactam was polymerized at 175°C in the presence of 0.3 mol percent of sodium and 0.3 mol percent of 1-dodecyl-3,3,5,5-tetramethyl-2,4,6-piperidinetrione and 0.1 mol percent of 1,3,5,5,-tetramethyl-2,4,6-piperidinetrione. After 60 minutes the polymerizate contained almost equilibrium amount of the copolyamide.

EXAMPLE 24

In a melt, containing 75 percent of caprolactam and 25 percent of laurolactam there was gradually dissolved 0.29 mol percent of sodium hydride and 0.3 mol percent of 1-octadecyl-3,3,5,5-tetramethyl-piperidine-2,4,6-trione and 0.1 mol percent of 1-phenyl-3,3-dimethyl-2,4,6-trione. After 60 minutes keeping at 160°C a very light-colored polymerizate was obtained, containing almost theoretical equilibrium amount of the polymer.

EXAMPLE 25

0.3 mol percent of sodium salt of caprolactam and 0.3 mol percent of the co-catalyst of the Example 13 were dissolved in molten caprolactam. The mixture was heated to 160° – 163°C for 120 minutes. The polymerizate contained almost theoretical equilibrium amount of the polyamide. Similar result was obtained with laurolactam, using the same amount of 1,3,5,5-tetramethyl-2,4,6-piperidine-trione at equal conditions of polymerization.

EXAMPLE 26

1 mol percent of sodium salt of pyrrolidone, prepared from pyrrolidone and sodium hydride, and 1 mol percent of 1,3-diethyl-5,5-dimethyl-2,4,6-piperidine-trione were dissolved at 80°C in pyrrolidone. After 24 hours at 30°C about 15 percent of polypyrrolidone was obtained, while without co-catalyst the polymerization practically did not take place (the conversion was lower than 1 percent).

EXAMPLE 27

0.5 mol percent of 1,3,3,5,5-pentamethyl-2,4,6-piperidine-trione and 0.5 mol percent of butyl lithium were dissolved in a 5 percent solution of trimethylene-propiolactam in anhydrous dimethyl sulfoxide. After 30 minutes at 30°C the polymer was precipitated with ether and isolated in an almost theoretical yield.

What is claimed is:

1. The method of preparing solid polyamides by anionic polymerization of cyclic lactams containing at least 4 atoms in a ring in the presence of cocatalysts of the formula:

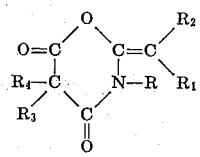

wherein $R_1$, $R_2$, $R_3$ and $R_4$ can be $C_{1-18}$ alkyl, $C_{1-18}$ alkenyl or aryl lower alkyl, R=$R_1$, aryl, dilower alkylaminoaryl or lower alkoxyaryl.

2. The method according to claim 1 wherein R is $C_6H_5$ and $R_1$, $R_2$, $R_3$ and $R_4$ are $CH_3$, respectively.

3. The method according to claim 1 wherein R, $R_1$, $R_3$ and $R_4$ are each $CH_3$ and $R_2$ is $C_2H_5$.

4. The method according to claim 1 wherein R is $C_6H_{11}$ and $R_1$, $R_2$, $R_3$ and $R_4$ are $CH_3$, respectively.

5. The method according to claim 1 wherein R is $C_2H_5$, $R_1$ and $R_2$ are each $CH_3$ and $R_3$ and $R_4$ are each $C_6H_5CH_2$.

6. The method according to claim 1 wherein R is p-$CH_3O \cdot C_6H_4$, $R_1$ and $R_2$ are each $CH_3$, $R_3$ is $C_2H_5$ and $R_4$ is $C_{18}H_{37}$.

7. The method according to claim 1 wherein R is $(CH_3)_2N \cdot C_6H_4$, and $R_1$, $R_2$, $R_3$ and $R_4$ are $CH_3$, respectively.

8. The method according to claim 1 wherein R is $C_{18}H_{37}$, $R_1$, $R_3$ and $R_4$ are each $CH_3$ and $R_2$ is $C_3H_7$.

9. The method according to claim 1 wherein said cyclic lactams are selected from the group comprising trimethylene propiolaktam, 2-pyrrolidone, caprolactam, γ-methyl caprolactam, caprylolactam, laurolactam and their mixtures.

* * * * *